United States Patent [19]

Clerici et al.

[11] Patent Number: 4,791,024
[45] Date of Patent: Dec. 13, 1988

[54] DISMEMBERABLE ADHESIVE JUNCTION SYSTEM

[75] Inventors: Piero R. Clerici, Milan; Italo Casalegno, Merate, both of Italy

[73] Assignee: Ausonia S.p.A., Monza, Italy

[21] Appl. No.: 463,833

[22] Filed: Feb. 4, 1983

[30] Foreign Application Priority Data

Feb. 4, 1982 [IT] Italy .................. 19444 A/82
Dec. 20, 1982 [IT] Italy .................. 24851 A/82

[51] Int. Cl.⁴ .................................................. C09U 7/02
[52] U.S. Cl. ........................................ 428/343; 428/496; 428/355; 428/511
[58] Field of Search ............ 428/496, 334, 355, 492, 428/511, 343; 525/232, 236, 237

[56] References Cited

U.S. PATENT DOCUMENTS

| | | | |
|---|---|---|---|
| 3,671,428 | 6/1972 | Doyle et al. | 428/492 |
| 3,681,190 | 8/1972 | Dahlquist | 428/496 |
| 3,713,935 | 1/1973 | Grecchi | 427/54.1 |
| 3,861,956 | 1/1975 | Schwarcz | 428/355 |
| 3,987,225 | 10/1976 | Reed et al. | 428/354 |
| 4,022,732 | 5/1977 | Schwarcz | 528/188 |
| 4,147,831 | 4/1979 | Balinth | 428/496 |

FOREIGN PATENT DOCUMENTS

| | | | |
|---|---|---|---|
| 742861 | 1/1956 | United Kingdom . | |
| 1215547 | 12/1970 | United Kingdom . | |
| 1354481 | 5/1974 | United Kingdom . | |
| 1439104 | 6/1976 | United Kingdom . | |
| 2069871 | 9/1981 | United Kingdom | 428/496 |

*Primary Examiner*—Edith Buffalow
*Attorney, Agent, or Firm*—Charles E. Brown; Charles A. Brown

[57] ABSTRACT

To provide a selective and repetitive junction system by adhesion of separate parts an adhesive element is suggested which is capable of being jointed only with another identical or similar element, which comprises a carrier and an adhesive layer on at least one side of the carrier, said layer being composed by an elastomeric material firmly anchored to the carrier. The layer is preferably rather thin and smooth.

4 Claims, 2 Drawing Sheets

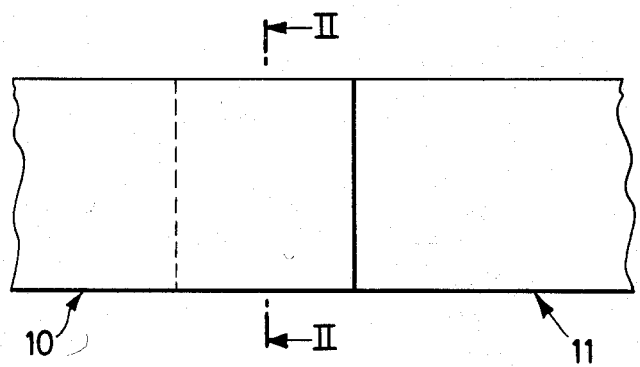
Fig.1
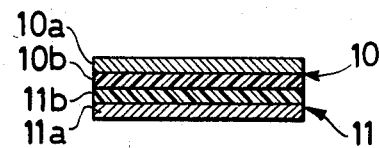
Fig.2
Fig.3
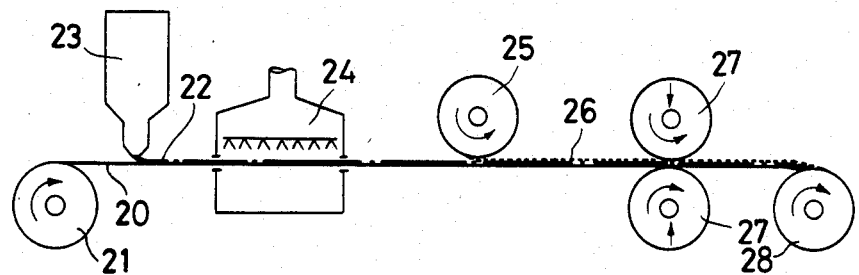

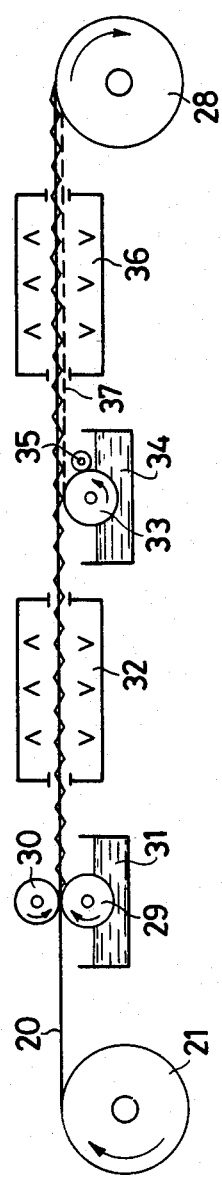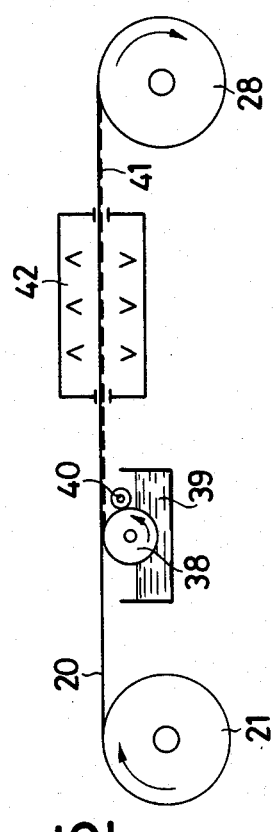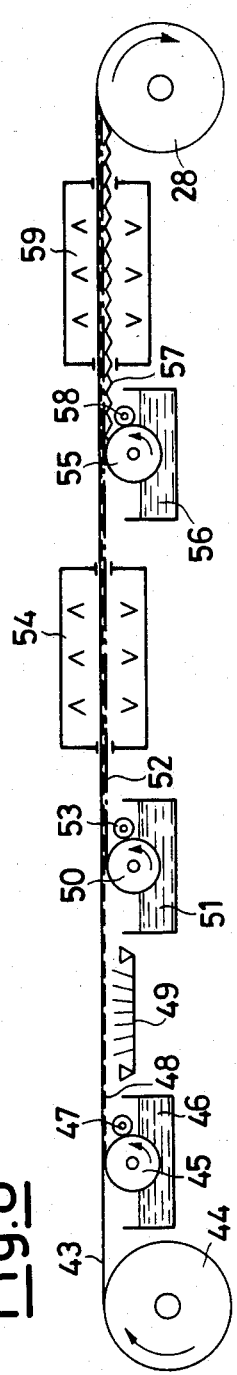

DISMEMBERABLE ADHESIVE JUNCTION SYSTEM

The subject matter of the present invention is a system for jointing by adhesion discrete parts, the possibility being afforded of jointing and separating these parts repeatedly.

A number of systems of this kind are known. It suffices to refer to those which employ as jointing means mechanical components such as screws, bolts, snapping clips and the like and to those which are based on chemicals without any other auxiliary means. Examples of the latter systems are the adhesive tapes which are capable of adhering with different force to different surfaces. This ability of the adhesive tapes to adhere to a wide variety of different surfaces is a great asset altogether, but it is a drawback in many instances. As a matter of fact, it is well known that if the adhesive tapes are brought with their adhesive layer in contact with surfaces of certain materials with respect to which they have a pronounced adhesive power, such a paper for example, a separation over a preselected plane of separation becomes virtually impossible. To prevent such an occurrence, it is possible to resort to adhesive masses having a lesser adhesive power and a very limited thickness, but in such a case a junction system is provided which has a scanty retention power. Another serious shortcoming of the conventional adhesive tapes is that they lose their adhesive power by the action of impurities, such as dust, fumes, moisture and other agents drawn from the environment.

In addition, junction systems are known which resort to two kinds of fabrics fitted with projecting parts, either fabric which hooks or like seizing components and the other fabric with arcuate portions or loops, capable of being mutually engaged. These junction systems are selective and do not permit adhesion to different surfaces but require for being coupled the two fabric types aforementioned. The jointing members are exposed to wear and in addition the union of the two fabrics has a certain thickness which is due to the projection of the hooking components.

An object of the present invention is to provide a junction system by adhesion which combines the advantages of both the adhesive tapes and of the mutually engageable fabric but without being affected by the respective defects. More particularly, the invention aims at providing a junction system which is selective and is not exposed to wear or negative factors due to environmental actions, while having a limited thickness.

This object is attained according to the invention by a junction system by adhesion comprising an adhesive element consistig of a carrier and at least an adhesive layer supported on at least one side of said carrier, characterized in that, in order to permit a selective junction of repetitive type, said element has an adhesive layer composed of an elastomeric material firmly anchored to said carrier.

The ability is known of elastomers and other materials having elastomer-like properties, of providing a mutual and intimate connection if they are contacted together and subjected to pressural forces and optionally also to heat. This phenomenon of adhesion, however, is conducive, as time goes on, to the formation of an extremely robust connection which does not allow for a new separation along a preferential preselected plane. As a matter of fact, if two sheets consisting exclusively of an elastomer which have been united under pressure receive a stress intended to cause the separation of the two, they, due to resilient property of the elastomers and their restricted thickness, would become stripped along random unpredictable planes and would break.

It has now been surprisingly ascertained that it is possible to obtain the separation of the jointed surfaces along a preferential preselected plane if the layers of elastomeric material are anchored to respective carries and if the intrinsic resistance of the carriers and anchoring to the carrier are stronger and more resistant than the separation force of the two surfaces of elastomeric material which had been contacted together. As a matter of fact, the presence of the carrier permits that the separation forces may be applied to a reduced portion of the elastomeric material so that the specific force becomes very high.

In order to further encourage the separation of the jointed surfaces along a preselected preferential plane, the invention provides advantageous actions on the entire mass of the elastomeric material of each layer, or on the contact surfaces only, that is on the free surfaces of the layers.

In this connection it has proven an asset to use as the elastomeric material a mixture of elastomeric materials, consisting for example of natural rubber and elastomers of a synthetic nature, such as butadiene-styrene rubber. A blend of that type which has provided good results may be composed of 80-85 parts by weight of natural rubber and 15-20 parts by weight of butadiene-styrene rubber, on a dry basis.

The elastomeric material can also be cured, but to such a degree of cross-linking as to still retain an adhesive power.

It has also been ascertained that if the layer of elastomeric material which is applied on the respective carrier, preferably by spreading, must be, with advantage, comparatively thin so as to encourage a fast union to the carrier while preventing a permanent adhesion to the other jointed element when the junction is undone. Preferably, the thickness of the elastomeric material layer does not exceed one millimetre.

Another feature which has proven to be important is that relative to the conditions of the free surface of the adhesive layer which must be coupled with that of another equal or like element. In this connection, it has been ascertained that said surface must be as smooth as practicable, so as to ensure the best functionality in the sense of encouraging the repeated separation of two adhesive elements from one another when it is desired to undo the junction.

Inasmuch as, as has been outlined above, the layer of elastomeric material must also be comparatively thin, the requirement that its free surface is as smooth as is practicable also involves the surface of the carrier to which such a layer is applied to be as smooth as is practicable.

The system of junction by adhesion according to the invention solves the problem of the selectivity of the junction and does away with the defect of the loss of adhesiveness due to the action of the environmental impurities, such as dust, fumes, moisture and the like. As a matter of fact, each adhesive element can be matched only to a like element which has a corresponding junction surface made of an elastomeric material. The system is quite reliably repetitive, that is, two adhesive elements can be united and then repeatedly set apart from one another. In addition, this junction system affords the advantage of having a comparatively reduced thickness which is anyhow thinner than that of a junction made of two fabrics fitted with hooking elements and loop elements projecting therefrom, respectively.

Two adhesive elements intended to be jointed together can be applied to articles one desires to unite and to this purpose a number of methods can be used such as nailing or riveting, screwing, stapling, cementing and many others.

The features of the invention and the advantages stemming therefrom will become more closely apparent from the ensuing disclosure of exemplary embodiments thereof, reference being had to the accompanying drawings, wherein:

FIG. 1 is a plan view of two adhesive elements in tape form united together.

FIG. 2 is a cross-sectional view taken along the line II—II of FIG. 1, and

FIGS. from 3 to 6 show diagrammatically a few possible ways of providing an adhesive element according to the invention.

The junction system according to the invention is shown in FIGS. 1 and 2 in which two adhesive elements united together, having a tape form and generally indicated at 10 and 11. Every one of these elements substantially consists of a carrier, 10a and 11a, respectively, which carries on either side a layer of an elastomeric material, 10b and 11b, respectively. The carrier of each elements is substantially planar and can be stiff, pliable or resilient. By way of example, in the case of an adhesive element in tape forms, this carrier can consist of a fabric, but it is understood that a number of different materials can be used, provided that they have a sufficient consistency and resistance relative to the elastomeric material so as to make the separation possible of the jointed surfaces without jeopardizing the functionality of the whole system.

The elastomeric material which is used to provide the adhesive layer can be, for example, natural rubber or a blend of natural rubber and a synthetic rubber. Its exposed surface is, with advantage and preferably, as smooth as can be obtained and the thickness of the layer preferably should not exceed one milimetre.

In the example shown an element is in the question, the carrier of which carries on either side only a layer of an elastomeric material, but it is apparent that, for certain uses and requirements, also an adhesive layer on both carrier surfaces can be provided.

The application of the layer of an elastomeric material and its fastening to the carrier can take place in a number of ways, a few of which are described hereinafter with reference to FIGS. from 3 to 6.

FIG. 3 diagrammatically shows the case in which the layer of elastomeric material is applied to the carrier by calendering.

Onto a carrier 20 coming from a feeding spool 21, a layer 22 of adhesive is spread by an apparatus 23 and the carrier with its adhesive layer spread thereon is then forwarded through a drying chamber 24. The adhesive 22 can consist of an elastomer for example natural rubber dissolved in a solvent such as heptane in the proportions of 15% natural rubber and 85% of heptane, by weight.

Subsequently, to the adhesive layer 22 there is applied by means of a feeding unit 25 a layer of an elastomer 26 coming from a spool (not shown) composed of alternate spirals of an elastomer and separator paper and the assembly is caused to pass between two calendering rollers 27. The element so formed is collected on a roller 28. The rollers 27 of the calender provide also to feed the tape forward at a speed which has been tested to be 5 meters per minute.

FIG. 4 shows another way of applying the elastomeric material on a carrier composed of a tape 20 of cotton fabric coming from a feeding spool 21. This tape is first passed between the paired rollers 29, 30. The roller 29 is motor-driven and dips in a tube 31 which contains a dissolved elastomeric material, whereas the roller 30 is idle and impresses onto the roller 29 a pressure which suffices to force the elastomeric material deeply into the fabric tape 20. The thus impregnated tape is then dried at a temperature of 90° C. by having it passed through a drying oven 32.

Thereafter, the tape passes on a spreading roller 33 which dips in another tub 34 which contains an elastomeric material which is the same as that contained in the tub 31. To limit the thickness of the film 37 spread onto the impregnated fabric tape a calibration roller 35 is provided. The element so prepared then passes through a second drying oven 36 in which it is dried at 90° C. to be finally collected by a spool 28.

The elastomeric materials contained in the tubs 31 and 34 and which, consistently with the field tests made, have given good results, are, for example :
 natural rubber latex with a percentage of rubber on a dry basis of 66% by weight;
 a compound comprising 85% of natural rubber latex (66% dry rubber) and 15% of butadiene-styrene latex (66% of dry rubber).

The spreading speed has been tested at 5 meters a minute.

FIG. 5 shows a procedure of application by a simple spreading of the elastomeric material onto either side of a carrier tape 20 coming from a feeding spool 21. The tape 20 is caused to pass on a spreading roller 38 which dips in a tub 39, the latter containing the elastomeric material and the quantity of such material is metered by a roller 40 which calibrates the thickness of the film 41.

The carrier so coated is then passed through a drying oven 42 in which it is subjected to heat at a temperature of 90° C. and is then collected on a roller 28.

By way of example a few field tests are reported.

(a) Carrier in the form of a woven fabric of cotton with several types of elastomeric materials;

(a1) natural rubber dissolved in heptane with a weight ratio of 15% natural rubber and 85% heptane: travelling speed 10 meters a minute;

(a2) Solution of 12% by weight natural rubber, 3% butadiene-styrene rubber and 85% of heptane as the solvent: travelling speed 10 meters a minute.

(a3) natural rubber latex 66% dry rubber : travelling speed 5 meters a minute.

(a4) blend of 80% dry weight of natural rubber latex and 20% dry weight of butyl rubber latex: travelling speed of 5 m/min.

(b) Carrier of the form of a polyvinylchloride tape to the surface of which an adhesive has been applied on the side to be spread with several kinds of elastomeric materials.

(b1) natural rubber latex 66% dry rubber: travelling speed 5 m/min.

(b2) blend of 80% dry weight of natural rubber latex and 20% dry weight of butyl rubber latex: travelling speed 5 m/min.

FIG. 6 shows still another example for obtaining an adhesive element according to the invention. In this case one starts from a carrier composed of a tape 43 of a nonwoven calendered polyethylene mat, coming from a spool 44, which is caused to pass on a spreader roller 45 dipping in a tub 46 which contains an aqueous dispersion of polyurethan (55% of polyurethan solids) and the thickness of the film 48 is metered by a calibration roller 47.

Subsequently, the tape 43 and the film 48 thereon is passed over a source of heat 49 which can be an infrared ray source to carry out polyurethan cross-linking. Subsequently, the tape 43 with the film 48 thereon is caused to pass on a second spreading roller 50 dipping in a tub 51 which contain a dispersion of a acryl-based adhesive resin (55% dry resin basis). Onto the film 48 a layer 52 of said resin is thus spread and the thickness of such layer is metered by a calibration roller 53.

The adhesive resin is dried by having the assembly passing through an oven 54 in which a temperature of 70° C. is maintained.

Lastly, the assembly is caused to pass over a spreading roller 55 dipping in a tub 56 which contains natural rubber latex (66% dry rubber). Onto the previously formed adhesive resin layer 52 a film 57 of rubber latex is thus spread, the thickness of which is metered by a calibration roller 58. The product is caused to pass through an oven 59 at a temperature of 70° C. and is collected by a roller 28.

The travelling speed has been tested at 5 m/min.

It has been stated that the elastomeric material applied to the carrier to provide the adhesive layer can also be cured; in this case, however, the degree of cross-linking should not jeopardize the adhesive property of the layer, at least in correspondence with its exposed surface.

In this case curing can also differentiated along the layer thickness, in the sense of having a more intensive curing in the areas closer to the carrier. Thus, it would even become possible to dispense with a discrete supporting member in that the portion having a more intense degree of vulcanization of the adhesive layer could take, as such, the role of a carrier.

To facilitate the repeated separation of the two adhesive elements coupled together it could be possible, moreover, to provide on the exposed surface of the elastomeric material additional filler materials such as threads, gauzes, powders and the like, at such a surface density as not to compromise the adhesiveness entirely.

The invention has been described by way of example with reference to a few exemplary embodiments but it should be understood that it shall not be regarded as being restructed to these examples which can be modified in a number of ways within the purview of a skilled artisan.

The system of junction as provided by the invention solves the technical problems outlined in the opening portion of the present disclosure quite completely.

More particularly, the junction system according to the invention is quite selective as it enables the junction to exist exclusively between adhesive elements of the same type and it permits that the junction may be done and undone repeatedly.

The adhesive element having a layer of an elastomeric material does not lose its adhesvie capacity by the action of impurities drawn from the surrounding environment and its adhesive layer(s) does not require particular screens such as silicone-coated papers. The adhesive element is not exposed to mechanical wear and it has a very reduced thickness as compared with that of the febrics having hooking projections.

The adhesive element can readily be applied to the discrete component parts to be united, for example by nails, rivets, screws, clips, sewing threads, cements, welding and so forth.

The expedients and the particular characteristics provided according to the present invention have proven to be extremely advantageous to the end of providing an eminently selective junction system in the sense that the material permits coupling exclusively between equal or like adhesive elements while concurrently the junction is of repetitive character as it can be done and undone many and many times and connects the elements in question along a preselected preferential plane also along a long time span without, however, originating a permanent junction such as to make impossible to separate the elements from one another without breaking same.

We claim:

1. In a joining system wherein two like elements are to be repeatedly connected together and released, an adhesive element comprising a carrier and an adhesive layer carried by one side of said carrier, said adhesive layer being formed of elastomeric material and being firmly anchored to said carrier, said adhesive layer having a face surface bondable only to a like face surface, and the strengths of said carrier and that of the anchoring of said adhesive layer to said carrier being greater than the releasable bond between like face surfaces, said elastomeric material being cured but only to such a degree that said elastomeric material retains its adhesive characteristics on said face surface, said elastomeric material being cured to a different degree through its thickness with the degree of curing being the stronger adjacent said carrier.

2. In a joining system according to claim 1, wherein the degree of curing of said elastomeric material is the highest in that portion joined to said carrier.

3. A releasable joining system comprising two separate but like adhesive elements repeatedly joinable and separable relative to one another, each of said adhesive elements comprising a carrier and an adhesive layer carried by one side of said carrier, said adhesive layer being formed of an elastomeric material and being firmly anchored to said carrier, said adhesive layer having a face surface bondable only to a like face surface, and the strengths of said carrier and that of the anchoring of said adhesive layer to said carrier being greater than the releasable bond between like face surfaces, said elastomeric material being cured but only to such a degree that said elastomeric material retains its adhesive characteristics on said face surface, said elastomeric material being cured to a different degree through its thickness with the degree of curing being the stronger adjacent said carrier.

4. A releasable joining system according to claim 3, wherein the degree of curing of said elastomeric material is the highest in that portion joined to said carrier.

* * * * *